United States Patent
Morimoto

[11] Patent Number: 6,118,748
[45] Date of Patent: Sep. 12, 2000

[54] OPTICAL INFORMATION STORAGE UNIT HAVING PHASE COMPENSATION MEANS FOR APPLYING DIFFERENT PHASE COMPENSATION QUANTITIES WITH RESPECT TO SIGNALS DETECTED FROM LAND AND GROOVE OF RECORDING MEDIUM

[75] Inventor: Yasuaki Morimoto, Kawasaki, Japan

[73] Assignee: Fujitsu Limited, Kawasaki, Japan

[21] Appl. No.: 09/045,305

[22] Filed: Mar. 20, 1998

[30] Foreign Application Priority Data

Oct. 6, 1997  [JP]  Japan ................................ 9-272867

[51] Int. Cl.⁷ ........................................ G11B 7/00
[52] U.S. Cl. .................... 369/112; 369/110; 369/44.24
[58] Field of Search ............................. 369/44.23, 44.24, 369/112, 110, 109, 58, 118

[56] References Cited

U.S. PATENT DOCUMENTS

| | | |
|---|---|---|
| 4,236,105 | 11/1980 | Wilkinson . |
| 4,694,447 | 9/1987 | Cohen et al. . |
| 5,519,685 | 5/1996 | Kato et al. ................... 369/110 |
| 5,530,641 | 6/1996 | Kanehira . |
| 5,600,620 | 2/1997 | Ohguri ........................ 369/112 |
| 5,625,613 | 4/1997 | Kato et al. ................... 369/118 |
| 5,625,725 | 4/1997 | Nakano et al. ............... 369/112 |
| 5,644,420 | 7/1997 | Nakane . |
| 5,831,942 | 11/1998 | Morimoto et al. . |
| 5,910,937 | 6/1999 | Akiba et al. ................. 369/44.24 |

FOREIGN PATENT DOCUMENTS

| | | |
|---|---|---|
| 58-75046 | 5/1983 | Japan . |
| 58-88838 | 5/1983 | Japan . |
| 59-185044 | 10/1984 | Japan . |
| 59-215084 | 12/1984 | Japan . |
| 60-246030 | 12/1985 | Japan . |
| 61-13458 | 1/1986 | Japan . |
| 61-236034 | 10/1986 | Japan . |
| 62-154329 | 7/1987 | Japan . |
| 62-214526 | 9/1987 | Japan . |
| 64-50248 | 2/1989 | Japan . |
| 1-133225 | 5/1989 | Japan . |
| 1-211258 | 8/1989 | Japan . |
| 2-118924 | 5/1990 | Japan . |
| 3-86953 | 4/1991 | Japan . |
| 3-157818 | 7/1991 | Japan . |
| 9-44922 | 2/1992 | Japan . |
| 4-113526 | 4/1992 | Japan . |
| 4-337528 | 11/1992 | Japan . |
| 5-182220 | 7/1993 | Japan . |
| 6-43394 | 2/1994 | Japan . |
| 6-150346 | 5/1994 | Japan . |
| 6-162526 | 6/1994 | Japan . |
| 7085523 | 3/1995 | Japan . |
| 7-169114 | 7/1995 | Japan . |
| 7-235095 | 9/1995 | Japan . |
| 7-320285 | 12/1995 | Japan . |
| 8-7357 | 1/1996 | Japan . |
| 8-329470 | 12/1996 | Japan . |
| 9-128825 | 5/1997 | Japan . |
| 9-161347 | 6/1997 | Japan . |
| 9161347 | 6/1997 | Japan . |

OTHER PUBLICATIONS

"Current Status & Future of Magneto–Optical Disks" by Nobutake Imamura, MO Disk, Japan, Aug. 21, 1996, pp. 54–55.

*Primary Examiner*—Nabil Hindi
*Attorney, Agent, or Firm*—Greer, Burns & Crain, Ltd.

[57] ABSTRACT

An optical information storage unit irradiates a light on a recording medium having a recording surface provided with a land and a groove and detects a reproduced signal from a light reflected from the recording medium. The optical information storage unit is provided with a phase compensation mechanism, provided in an optical path through which the light irradiated on the recording medium and a reflected light from the recording medium passes, for applying with respect to the reflected light a first phase compensation quantity required to detect a signal from the land and a second phase compensation quantity required to detect a signal from the groove.

10 Claims, 8 Drawing Sheets

OPTICAL INFORMATION STORAGE UNIT HAVING PHASE COMPENSATION MEANS FOR APPLYING DIFFERENT PHASE COMPENSATION QUANTITIES WITH RESPECT TO SIGNALS DETECTED FROM LAND AND GROOVE OF RECORDING MEDIUM

BACKGROUND OF THE INVENTION

The present invention generally relates to optical information storage units, and more particularly to an optical information storage unit suited for carrying out a high-density information recording and reproduction.

In this specification, an "information storage unit" refers to an apparatus which records information on and/or reproduces information from a recording medium.

Recently, there is much attention on a recording and reproducing technique which uses the near field when magneto-optically recording and reproducing information on and from a recording medium. Active research is made particularly in a technique which uses a solid immersion lens (hereinafter referred to as a solid immersion lens (SIL) technique), because the SIL technique can realize a super high density information recording and reproduction. The SIL technique itself is disclosed for example in "Current Status & Future of Magneto-Optical Disks" by Nobutake Imamura, MO DISK, Japan, 21st, August 1996, pp.54–55.

FIG. 1 is a cross sectional view for explaining the operating principle of the SIL technique. In FIG. 1, a bundle of rays emitted from a light source (not shown) is once converted into parallel rays by a collimator lens (not shown) or, is converted into a convergent spherical wave by a non-aberration lens 105 which can converge the bundle of rays to a diffraction limit in a state of a direct divergent light. The convergent spherical wave is incident to a spherical surface side of a hemispherical lens 106 which is made of a material having a large refractive index, and converges on a surface cut along a equatorial plane of the hemispherical lens 106.

A magneto-optic recording medium 107 is made up of a substrate 107a, a magneto-optic recording layer 107b, and a protection layer 107c. A gap between the hemispherical lens 106 and the magneto-optic recording layer 107b is maintained less than or equal to a wavelength of the bundle of rays irradiated due to an air flow. Because the refractive index of the hemispherical lens 106 is extremely large, a large portion of the bundle of rays undergoes a total reflection if no object exists in a vicinity of the convergent surface. However, if an object exists in the vicinity of the convergent surface, the bundle of rays is radiated due to an evanescent wave coupling.

A spot size of a light beam at an emission surface of the hemispherical lens 106 is inversely proportional to a product of the refractive index and a numerical aperture (NA) of the non-aberration lens 105. In other words, the larger both the refractive index and the NA are, the smaller the spot size of the light beam. For example, if the refractive index is 2, the spot size of the light beam becomes one-half by the provision of the hemispherical lens 106 as compared to a case where only the non-aberration lens 106 having the same NA is provided.

As described above, the SIL technique is an extremely important technique for realizing the super high density information recording and reproduction. For this reason, in order to further improve the recording density, it is desirable to apply the SIL technique to a magneto-optic recording medium having a land and a groove to be recorded with information.

When recording the information on the land, the groove exists between two adjacent lands, and the generation of a crosstalk in which the information recorded on the adjacent land mixes into the reproduced information is suppressed because the lands recorded with the information are separated from each other. Similarly, when recording the information on the groove, the land exists between two adjacent grooves, and the generation of a crosstalk in which the information recorded on the adjacent groove mixes into the reproduced information is suppressed because the grooves recorded with the information are separated from each other.

However, when recording the information on both the land and the groove, .information recording regions become contiguous and the generation of the crosstalk from the contiguous recording regions is unavoidable, thereby greatly affecting the information reproducing characteristic.

A method of reducing the crosstalk from the land or the groove by appropriately setting a depth of the groove has been proposed in a Japanese Laid-Open Patent Application No. 8-7357, for example. According to this proposed method, in a case where the wavelength of the light beam is 680 nm, the NA of an objective lens used is 0.55 and the widths of the land and the groove are 0.7 $\mu$m, the crosstalk is reduced by setting the depth of the groove to approximately ⅙ the wavelength.

But even if the spot size of the light beam irradiated on the recording surface of the magneto-optic recording medium is the same, as the track pitch becomes narrower by the use of the SIL technique described above, there was a problem in that the crosstalk cannot be reduced sufficiently in the case of a groove having the depth on the order of approximately ⅙ the wavelength. In addition, compared to the normal case where the depth of the groove of the magneto-optic recording medium is ⅛ the wavelength, there also were problems in that a carrier level of the signal decreases and a level of a push-pull signal which is used as a tracking error signal also decreases in the case of the groove having the depth on the order of approximately ⅙ the wavelength.

On the other hand, it has been reported that the condition for reducing the crosstalk in the proposed method, that is, the setting of the depth of the groove of the magneto-optic recording medium, easily changes depending on the Kerr ellipticity, spherical aberration and focal error of the objective lens, and the like.

Furthermore, a Japanese Laid-Open Patent Application No. 9-128825, for example, proposes a method of reducing the crosstalk by setting the width of the land approximately the same as the width of the groove having an optical depth of approximately ⅛ the wavelength when recording the information on the land and the groove of the magneto-optic recording medium. But in this case, it is necessary to provide two read channels, namely, a read channel for reproducing the signal from the land and a read channel for reproducing the signal from the groove, and it is also necessary to provide a plurality of wave plates and prisms or the like for separating the bundle of rays. Consequently, there was a problem in that the optical information storage apparatus according to this proposed method becomes expensive.

On the other hand, even in the case where the information is recorded on the land or the groove of the magneto-optic recording medium, a reflected light component from the adjacent groove or land increases thereby introducing a phase error as the track pitch is further reduced by employing the SIL technique. As a result, there was a problem in that the information cannot be reproduced satisfactorily from the magneto-optic recording medium because the polarized state changes due to the phase error.

SUMMARY OF THE INVENTION

Accordingly, it is a general object of the present invention to provide a novel and useful optical information storage unit in which the problems described above are eliminated.

Another and-more specific object of the present invention is to provide an optical information storage unit which can reduce a crosstalk from adjacent tracks on a recording medium and can satisfactorily reproduce information use of a relatively simple and inexpensive optical system.

Still another object of the present invention is to provide an optical information storage unit for irradiating light on a recording medium having a recording surface provided with a land and a groove and for detecting a reproduced signal from a light reflected from the recording medium, comprising phase compensation means, provided in an optical path through which the light irradiated on the recording medium and a reflected light from the recording medium passes, for applying with respect to the reflected light a first phase compensation quantity required to detect a signal from the land and a second phase compensation quantity required to detect a signal from the groove. According to the optical information storage unit of the present invention, it is possible to reduce a crosstalk from adjacent tracks on the recording medium and to satisfactorily reproduce information, by use of a relatively simple and inexpensive optical system.

The phase compensation means may comprise one or a plurality of wave plates.

One of the wave plates may apply a phase error $\lambda/2 \cdot N - P$ or $\lambda/2 \cdot N + P$ with respect to the reflected light, where $\lambda$ denotes a wavelength of the light irradiated on the recording medium, P denotes an absolute value of one of the first and second phase compensation quantities, and N denotes an integer greater than 0.

One of the wave plates may be rotatable with respect to a light incident thereto.

A crystal optical axis of the one of the wave plates may be parallel or perpendicular to an electrical vector of the light irradiated on the recording medium.

The phase compensation means may comprise a first wave plate having a direction of a crystal optical axis thereof fixed with respect to an electrical vector of the light irradiated on the recording medium, and a second wave plate rotatable with respect to a light incident thereto, the second wave plate being a ½ wave plate.

The second wave plate may have a state where a crystal optical axis of the second wave plate is parallel or perpendicular to an electrical vector of the light incident thereto, and a state where the crystal optical axis of the second wave plate forms a 45° angle with respect to the electrical vector of the light incident thereto.

The second wave plate may have a state where a crystal optical axis of the second wave plate is perpendicular to the crystal optical axis of the first wave plate, and a state where the crystal optical axis of the second wave plate forms a 45° angle with respect to the crystal optical axis of the first wave plate.

The second wave plate may have a state where a crystal optical axis of the second wave plate is parallel to the crystal optical axis of the first wave plate, and a state where the crystal optical axis of the second wave plate forms a 45° angle with respect to the crystal optical axis of the first wave plate.

The first wave plate may be arranged in front of the second wave plate along a traveling direction of the reflected light from the recording medium.

The phase compensation means may comprise an electro-optic element in place of the second wave plate.

Other objects and further features of the present invention may be apparent from the following detailed description when read in conjunction with the accompanying drawings.

DESCRIPTION OF THE PREFERRED EMBODIMENTS

Figure 1:
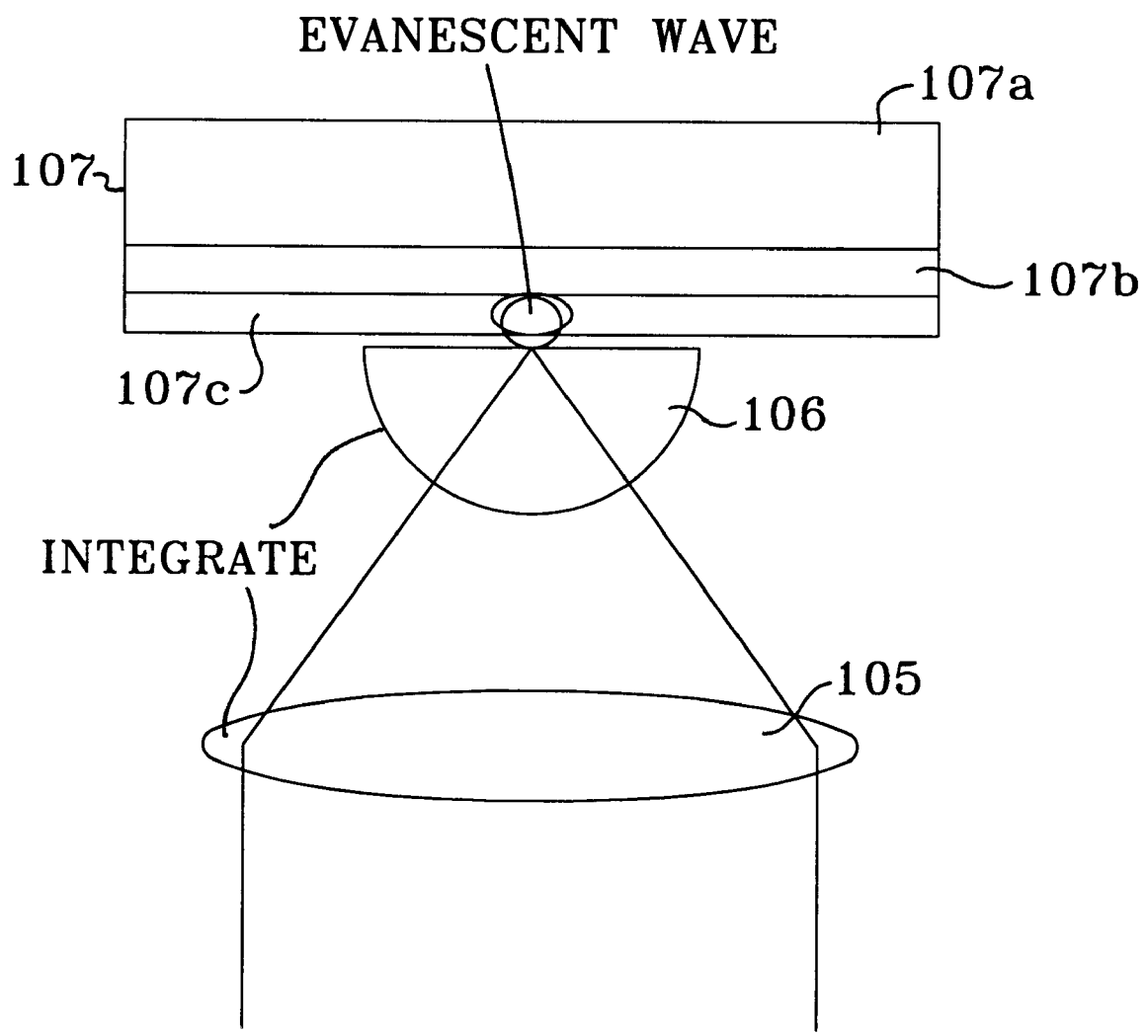
FIG. 1 is a cross sectional view for explaining the operating principle of a SIL technique.
Figure 2:
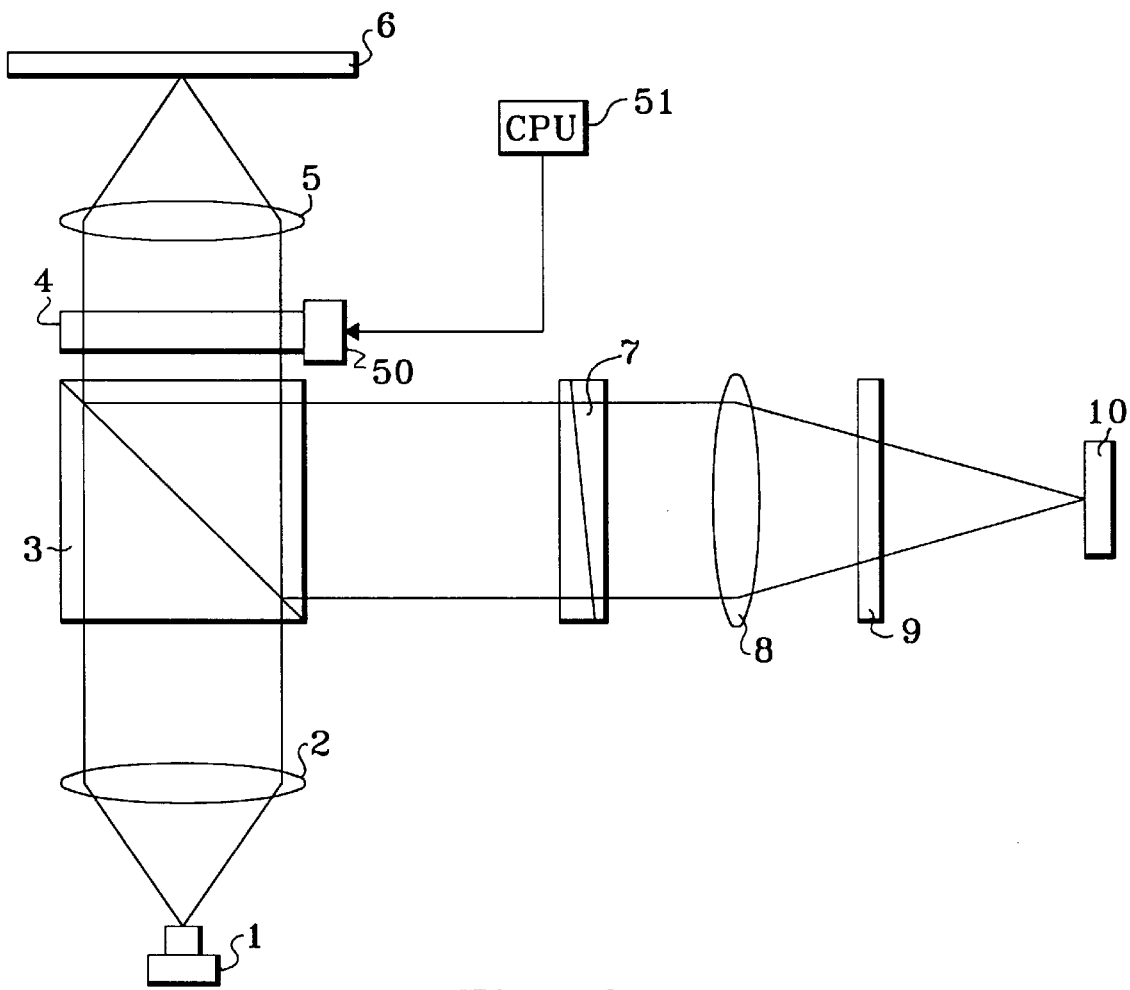
FIG. 2 is a plan view showing the general construction of an optical system of a first embodiment of an optical information storage unit according to the present invention.

FIG. 2 is a plan view showing the general construction of an optical system of a first embodiment of an optical information storage unit according to the present invention. In FIG. 2, a bundle of rays emitted from a semiconductor laser 1 is converted into parallel rays by a collimator lens 2, and becomes incident to a polarization beam splitter 3. The polarization beam splitter 3 has transmitting and reflecting characteristics such that transmittances Tp and Ts of the polarization beam splitter 3 with respect to P-polarized light component and S-polarized light component and reflectivities Rp and Rs of the polarization beam splitter 3 with respect to the P-polarized light component and the S-polarized light components are respectively set to satisfy Tp:Rp=80:20 and Ts:Rs=2:98.

The bundle of rays transmitted through the polarization beam splitter 3 according to the transmitting characteristic of the polarization beam splitter 3 is supplied to a wave plate 4. The wave plate 4 has a function of making a necessary phase compensation when reproducing information recorded on a land or a groove provided on a recording surface of a magneto-optic recording medium 6 such as a magneto-optic disk. A phase error applied to the bundle of rays by the wave plate 4. is set to $\lambda/2 \cdot N - P$ or $\lambda/2 \cdot N + P$, where $\lambda$ denotes a wavelength of the light irradiated on the magneto-optic recording medium 6, P denotes an absolute value of a phase compensation quantity required to reproduce the information recorded on the land or the groove, and N denotes an integer greater than 0. In this embodiment, the phase error applied to the bundle of rays by the wave plate 4 is 150° when described by an angle and is 30° when described by a phase compensation quantity.

The wave plate 4 is rotatably provided with respect to the bundle of rays incident thereof, so that an electrical vector of the bundle of rays incident to the wave plate 4 can assume a state parallel or perpendicular to a crystal optical axis of the wave plate 4. The wave plate 4 is rotated by a driving mechanism 50 in response to a control signal from a central processing unit (CPU) 51, and for example, the driving mechanism 50 may be realized by a known electromagnetic driving mechanism made up of a voice coil and a magnet.

Figure 3:
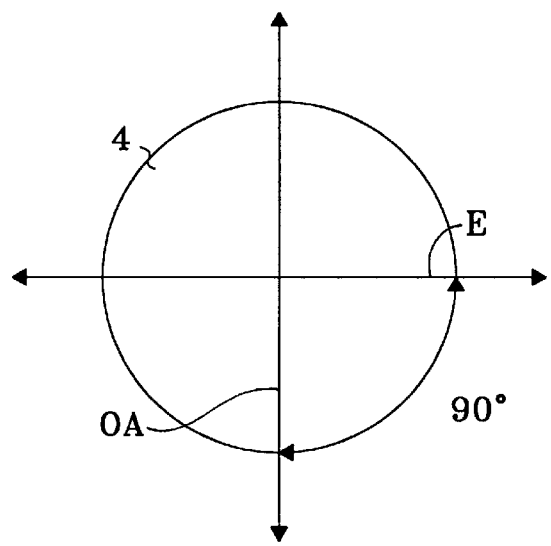
FIG. 3 is a diagram showing the relationship of a crystal optical axis of a wave plate and an electrical vector of an incident bundle of rays incident to the wave plate, viewed from a direction from which the bundle of rays are incident to the wave plate.

FIG. 3 is a diagram showing the relationship of a crystal optical axis OA of the wave plate 4 and an electrical vector E of the incident bundle of rays incident to the wave plate 4, viewed from a direction from which the bundle of rays are incident to the wave plate 4. The crystal optical axis OA rotates as indicated by arcuate arrows in FIG. 3.

The bundle of rays transmitted through the wave plate 4 is converged to the diffraction limit by an objective lens 5, and is irradiated on the recording surface of the magneto-optic recording medium 6. When the bundle of rays is irradiated on the recording surface of the magneto-optic recording medium 6, magnetic domains are recorded on a track formed on the recording surface or, magnetic domains on the track are reproduced. The bundle of rays reflected by the recording surface of the magneto-optic recording medium 6 again passes through the objective lens 5, and becomes incident to the wave plate 4.

Next, a description will be given of a case where the crystal optical axis OA of the wave plate 4 is parallel to the electrical vector E of the incident bundle of rays, and a case where the crystal optical axis OA of the wave plate 4 is perpendicular to the electrical vector E of the incident bundle of rays, when irradiating the bundle of rays on the magneto-optic recording medium 6. The crystal optical axis OA of the wave plate 4 in the case where the crystal optical axis OA is parallel to the electrical vector of the incident bundle of rays is perpendicular to the crystal optical axis OA in the case where the crystal optical axis OA is perpendicular to the electrical vector E of the incident bundle of rays, and thus, a low-speed axis and a high-speed axis of the wave plate 4 switch between the two cases. This means that, with respect to the reflected bundle of rays from the magneto-optic recording medium 6, the polarity of the phase compensation quantity required to reproduce the information inverted between the two cases. For this reason, the information can be reproduced under appropriate conditions from a track formed on the land or the groove of the magneto-optic recording medium 6, by rotating the crystal optical axis OA of the wave plate 4 depending on whether the track being reproduced is formed on the land or the groove. More particularly, the CPU 51 discriminates whether the track being reproduced is formed on the land or the groove based on an address on the magneto-optic recording medium 6, the polarity of a tracking error signal (push-pull signal) which will be described later, and the like, and supplies a control signal indicating the land or the groove to the driving mechanism 50. Therefore, it is possible to rotate the crystal optical axis OA of the wave plate 4 depending on whether the track being reproduced is formed on the land or the groove.

The bundle of rays transmitted through the wave plate.4 is reflected by the polarization beam splitter 3 according to the reflecting characteristic of the polarization beam splitter 3, and is directed towards a magneto-optic signal detection optical system. In other words, the bundle of rays directed towards the magneto-optic signal detection optical system is supplied to a Wollaston prism 7 which separates the bundle of rays into 3 light components, namely, a P-polarized light component, a S-polarized light component, and a mixed light component in which the P-polarized light component and the S-polarized light component coexist. The 3 light components obtained from the Wollaston prism 7 are irradiated on a photodetector 10 via a convergent lens 8 and a cylindrical lens 9, and a photoelectric conversion takes place in the photodetector 10.

The Wollaston prism 7 is made up of parallepiped or cube shaped crystal blocks which are connected to each other at a plane where the optical axes of the two crystals form an angle with respect to an incident surface thereof. Since the Wollaston prism 7 is adjusted to an infinite focal point, the blocks may be fixed by bonding after the adjustment.

Figure 4:
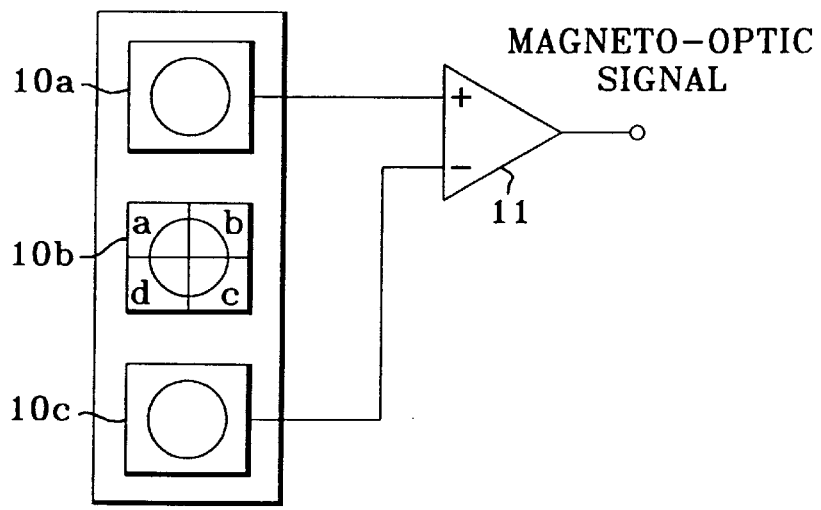
FIG. 4 is a plan view showing the general construction of a photodetector.

FIG. 4 is a plan view showing the general construction of the photodetector 10. In FIG. 4, the photodetector 10 includes detectors 10a and 10c, and a 4-part detector 10b. The P-polarized light component and the S-polarized light component having mutually perpendicular electrical vectors are respectively supplied to the detectors 10a and 10c. On the other hand, the mixed light component in which the P-polarized light component and the S-polarized light component coexist is supplied to the 4-part detector 10b which is arranged at a central portion of the photodetector 10. The 4-part detector 10b includes 4 detector parts a through d. A focal error signal and a tracking error signal are generated based on output detection signals of the detector parts a through d of the 4-part detector 10b, by utilizing the astigmatism generated when the mixed light component in which the P-polarized light component and the S-polarized light component coexist is transmitted through the convergent lens 8 and the cylindrical lens 9. In addition, a magneto-optic signal is generated by obtaining a difference between output detection signals of the detectors 10a and 10c by a differential amplifier 11.

If the output detection signals of the detector parts a through d of the 4-part detector 10b are respectively denoted by a through d, the focal error signal can be obtained by calculating (a+c)−(b+d). In addition, the tracking error signal can be obtained by calculating (a+b)−(c+d).

Next, a description will be given of signal characteristics obtained when the information is recorded on and reproduced from the magneto-optic recording medium 6 according to this embodiment. In this case, the wavelength $\lambda$ of the bundle of rays emitted from the semiconductor laser 1 is 680 nm, and the numerical aperture (NA) of the objective lens 5 is 0.55. In addition, the magneto-optic recording medium 6 is a magneto-optic disk, widths of the land and the groove are 0.7 μm in a radial direction of the magneto-optic disk, and an optical depth of the groove is λ/8. Furthermore, the electrical vector of the bundle of rays (laser light) irradiated on the recording surface of the magneto-optic disk is parallel to the tracks formed on the land and the groove.

Figure 5:
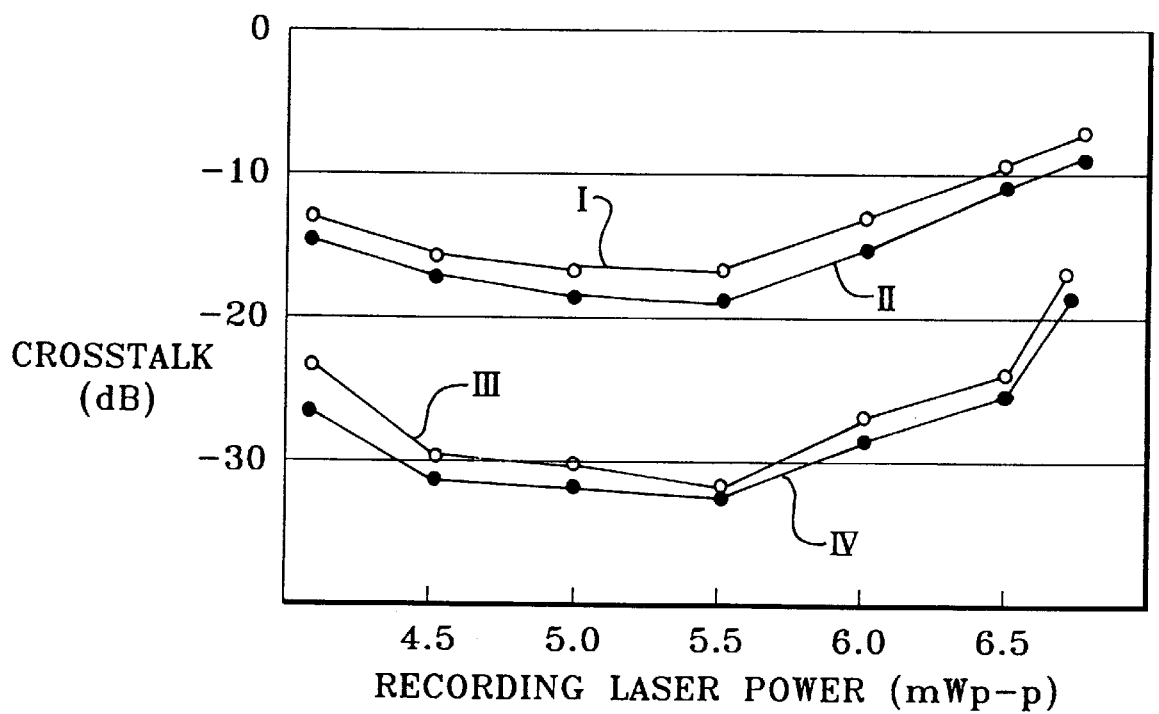
FIG. 5 is a diagram showing measured result of a recording laser power dependency of a crosstalk from an adjacent track.

First, a mark having a mark length of 2 μm was recorded on the land (or groove) of the magneto-optic disk, and a carrier level Cm was measured. In addition, the groove (or land) which is adjacent to the above described land (or groove) was reproduced, and a crosstalk Ct=Cm−Camax was obtained by denoting the higher carrier level by Camax. FIG. 5 shows measured results of a recording laser power dependency of the crosstalk from the adjacent track obtained in this manner. In FIG. 5, a white circular mark indicates the crosstalk from the land, and a black circular mark indicates the crosstalk from the groove. In addition, characteristics I and II indicate characteristic which are obtained when no phase compensation is made, and characteristics III and IV indicate characteristics which are obtained when the phase compensation is made as in this embodiment.

As shown in FIG. 5, both the crosstalks from the land and the groove are −30 dB or less in a wide recording laser power range. In addition, since the optical depth of the groove of the magneto-optic disk is λ/8, the phase compensation quantity which makes the crosstalk a minimum and the phase compensation quantity which makes a narrow band signal-to-noise ratio (or carrier-to-noise ratio (CNR) a maximum match when the signals are recorded on and reproduced from the land and the groove. In other words, the phase compensation quantity which makes the CNR a maximum and the crosstalk a minimum is the same for the case where the signal is reproduced from the land and for the case where the signal is reproduced from the groove.

Figure 6:
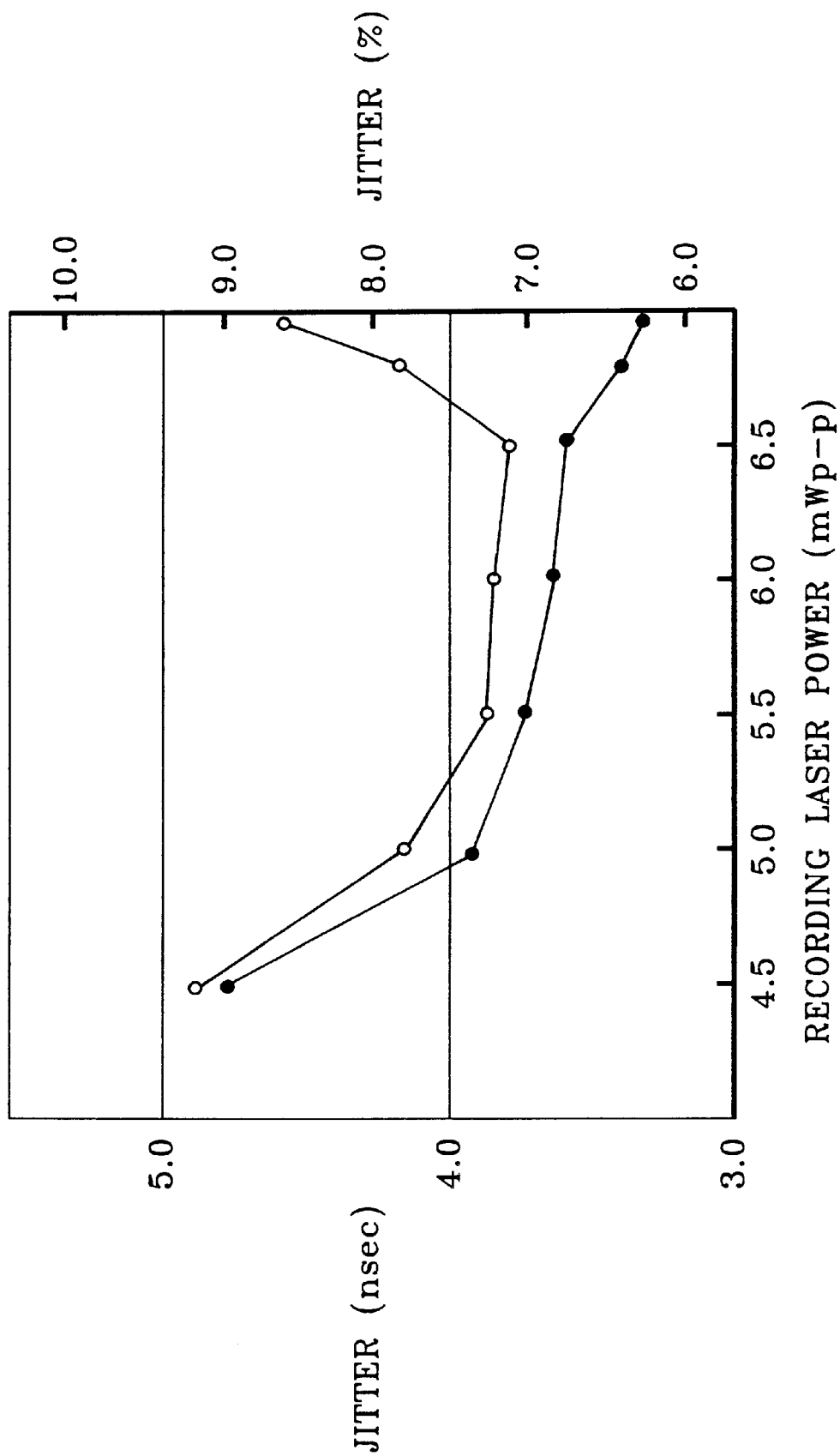
FIG. 6 is a diagram showing measured results of a recording laser power dependency of a 2T jitter.

Next, a random signal having a length 2T=0.48 μm which is a minimum mark length in the RLL1–7 (RLL: run length limited) code was recorded on the magneto-optic disk at a linear velocity of 4.5 m/sec according to the pulse assist magnetic field modulation system, and then reproduced at a reproducing laser power of 1.3 mW. FIG. 6 shows measured results of the recording laser power dependency of the 2T-jitter obtained in this manner. In FIG. 6, a white circular mark indicates the jitter from the land, and a black circular mark indicates the jitter from the groove. The jitter in this case is defined as a value (%) which is obtained by multiplying 100 to a ratio of a standard deviation σ2T of the 2T signal with respect to a predetermined window width (time). In addition, the reproducing laser power refers to the laser power when the light is output from the objective lens 5.

As shown in FIG. 6, when the signal was recorded on both the land and the groove of the magneto-optic disk and then reproduced, it was confirmed that the jitter is 9% or less in a wide recording laser power range and that a large margin can be secured with respect to the jitter. Generally, if an average jitter between a clock and the data is 12% or less, it is judged that the jitter is within a sufficiently tolerable range for the data recording and reproduction. In this embodiment, even though the evaluation is made with respect to the jitter of 2T which is the minimum mark length, a satisfactory result in which the jitter is 9% or less was obtained, and it was therefore confirmed that the data recording and reproduction is completely unaffected by the jitter from the practical point of view.

When no phase compensation is made, the crosstalk between the tracks is −20 dB or greater and is extremely large as may be seen from the characteristics I and II shown in FIG. 5. For this reason, when reproducing the signal from the land and the groove in this case, it was impossible to realize a jitter of 12% or less at any recording laser power.

On the other hand, this embodiment carries out the phase compensation for reproducing the signal from the land of the magneto-optic disk and the phase compensation for reproducing the signal from the groove of the magneto-optic disk by use of a relatively simple structure. As a result, no inconveniences such as the reduction of the signal level and an insufficient CNR are introduced because the phase compensations are made, and it is possible to greatly improve the signal quality when recording and reproducing the signal on and from the magneto-optic disk.

Figure 7:
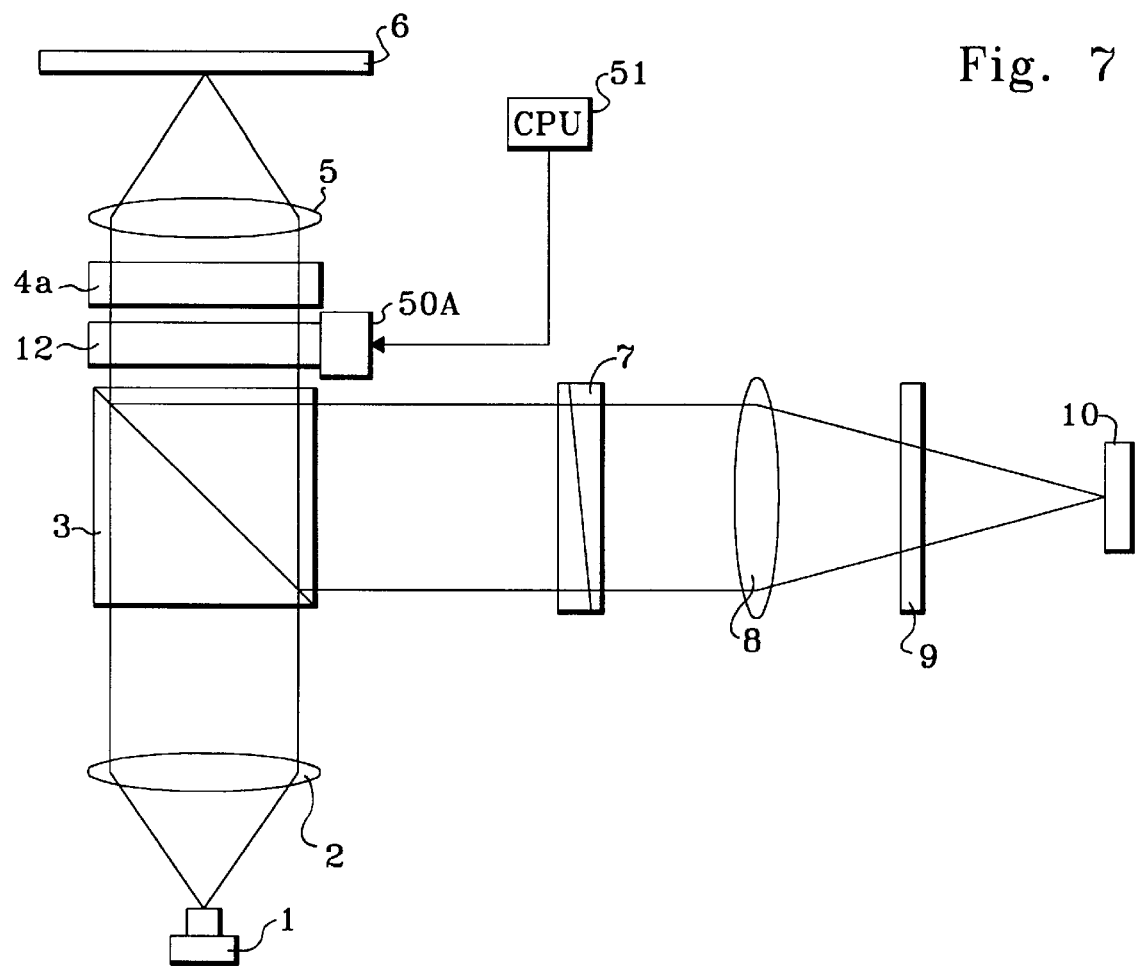
FIG. 7 is a plan view showing the general construction of an optical system of a second embodiment of the optical information storage unit according to the present invention.

Next, a description will be given of a second embodiment of the optical information storage unit according to the present invention. FIG. 7 is a plan view showing the general construction of an optical system of the second embodiment. In FIG. 7, those parts which are the same as those corresponding parts in FIG. 2 are designated by the same reference numerals, and a description thereof will be omitted.

In FIG. 7, the bundle of rays transmitted through the polarization beam splitter 3 is supplied to a ½ (λ/2) wave plate 12. This ½ wave plate 12 has one of the following first and second structures. According to the first structure, the ½ wave plate 12 is provided rotatable by a driving mechanism 50A with respect to the incident bundle of rays so that a crystal optical axis of the ½ wave plate 12 is parallel to or forms a 45° angle to the electrical vector of the incident bundle of rays. On the other hand, according to the second structure, the ½ wave plate 12 is provided rotatable by the driving mechanism 50A with respect to the incident bundle of rays so that the crystal optical axis of the ½ wave plate 12 is perpendicular to or forms a 45° angle to the electrical vector of the incident bundle of rays. More particularly, the ½ wave plate 12 is rotated by the driving mechanism 50A in response to a control signal from the CPU 51, and for example, the driving mechanism 50A may be realized by a known electromagnetic driving mechanism made up of a voice coil and a magnet. The electrical vector of the bundle of rays transmitted through the ½ wave plate 12 rotates by 90° in both cases where the ½ wave plate 12 has the first structure and the ½ wave plate 12 has the second structure, and thus, the ½ wave plate 12 may have either the first structure or the second structure.

The CPU 51 discriminates whether the track being reproduced is formed in the land or the groove of the magneto-optic disk, based on an address on the magneto-optic disk, the polarity of the tracking error signal (push-pull signal) and the like, and supplies a control signal indicating the land or the groove to the driving mechanism 50A. As a result, it is possible to rotate the crystal optical axis of the ½ wave plate 12 depending on whether the track being reproduced is formed in the land or the groove of the magneto-optic disk. In order to obtain a reproduced signal having a high quality, it is desirable to select the electrical vector in the direction perpendicular to the track when reproducing the signal from the land, and to select the electrical vector in the direction parallel to the track when reproducing the signal from the groove.

The bundle of rays transmitted through the ½ wave plate 12 is supplied to a wave plate 4a. This wave plate 4a applies to the bundle of rays a phase error similar to that used in the first embodiment described above. In addition, the wave plate 4a is fixedly arranged so that a crystal optical axis of the wave plate 4a is parallel or perpendicular to the electrical vector of the bundle of rays transmitted through the ½ wave plate 12. Furthermore, the wave plate 4a has a function of carrying out a phase compensation that is necessary to reproduce the information recorded on the land or the groove.

Figure 8:
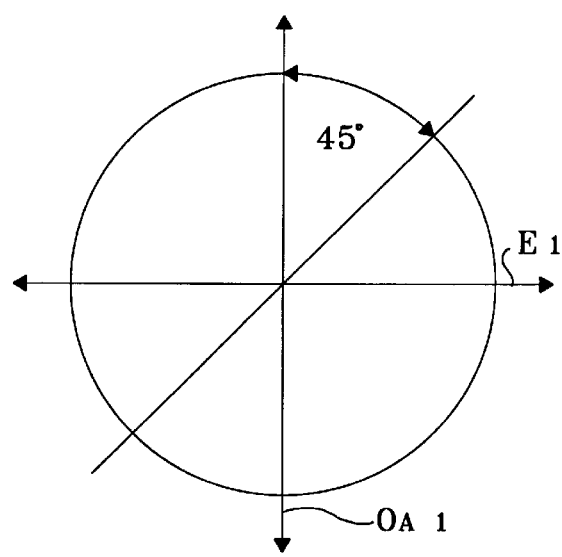
FIG. 8 is a diagram showing the relationship of an arrangement of an electrical vector of an incident bundle of rays incident to a ½ wave plate and a crystal optical axis of the ½ wave plate.
Figure 9:
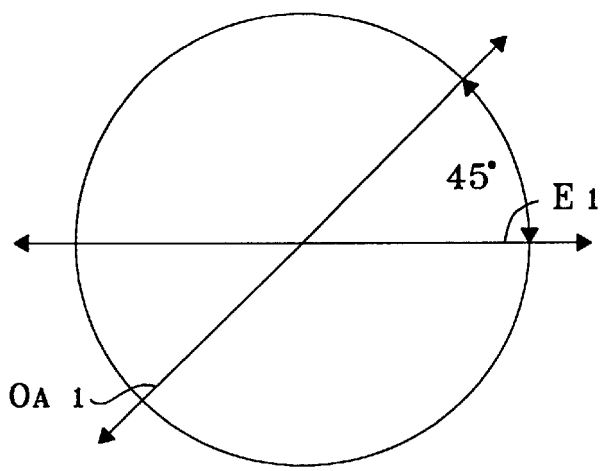
FIG. 9 is a diagram showing the relationship of an arrangement of the electrical vector of the incident bundle of rays incident to the ½ wave plate and the crystal optical axis of the ½ wave plate.

FIGS. 8 and 9 respectively are diagrams showing the relationship of the arrangement of the electrical vector of the incident bundle of rays incident to the ½ wave plate 12 and the crystal optical axis of the ½ wave plate 12. FIG. 8 shows a case where the ½ wave plate 12 has the second structure described above, and in this case, an electrical vector E1 of the incident bundle of rays and a crystal optical axis OA1 of the ½ wave plate 12 rotate as indicated by arcuate arrows, and the two are perpendicular to each other or form a 45° angle with each other. On the other hand, FIG. 9 shows a case where the ½ wave plate 12 has the first structure described above, and in this case, the electrical vector E1 of the incident bundle of rays and the crystal optical axis OA1 of the ½ wave plate 12 rotate as indicated by arcuate arrows, and the two are parallel to each other or form a 45° angle with each other.

Figure 10:
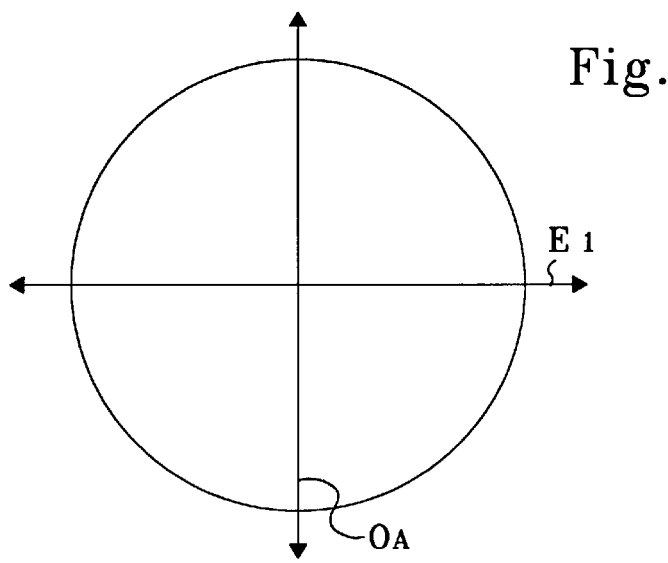
FIG. 10 is a diagram showing the relationship of an arrangement of the electrical vector of the incident bundle of rays incident to the ½ wave plate and the crystal optical axis of the ½ wave plate.
Figure 11:
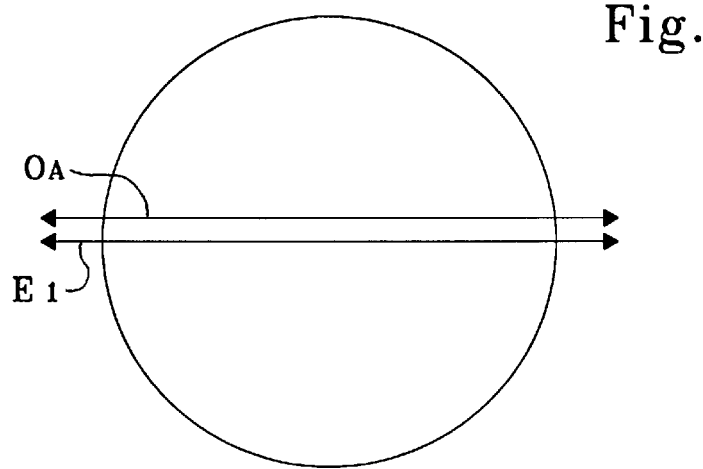
FIG. 11 is a diagram showing the relationship of an arrangement of the electrical vector of the incident bundle of rays incident to the ½ wave plate and the crystal optical axis of the ½ wave plate.

With regard to the arrangement of the crystal optical axis of the wave plate 4a, it is conceivable to use the arrangements shown in FIGS. 10 and 11 with respect to the cases shown in FIGS. 8 and 9. This is because there are 2 conceivable cases, namely, a case where the crystal optical axis of the wave plate 4a is a high-speed axis and a case where the crystal optical axis of the wave plate 4a is a low-speed axis. FIG. 10 is a diagram showing a case where a crystal optical axis OA of the wave plate 4a is perpendicular to the electrical vector E1 of the incident bundle of rays incident to the ½ wave plate 12. In addition, FIG. 11 is a diagram showing a case where the crystal optical axis OA of the wave plate 4a is parallel to the electrical vector E1 of the incident bundle of rays incident to the ½ wave plate 12.

The bundle of rays transmitted through the ½ wave plate 12 and the wave plate 4a which are arranged in the above described manner is converged to a diffraction limit by the objective lens 5, and is irradiated on the recording surface of the magneto-optic recording medium 6. The bundle of rays reflected by the recording surface of the magneto-optic recording medium 6 again passes through the objective lens 5 and is supplied to the wave plate 4a.

In the process of irradiating the bundle of rays on the recording surface of the magneto-optic recording medium 6, the direction of the electrical vector of the bundle of rays irradiated on the recording surface is determined according to the relationship of the crystal optical axis OA1 of the ½ wave plate 12 and the direction of the electrical vector of the incident bundle of rays incident to the ½ wave plate 12. In addition, in the process of irradiating the bundle of rays on the recording surface, the state of the linearly polarized light is maintained by being completely unaffected by the phase error, since the crystal optical axis OA of the wave plate 4a is parallel or perpendicular to the direction of the electrical vector of the incident bundle of rays incident to the ½ wave plate 12. Hence, the wave plate 4a carries out a phase compensation with respect to the bundle of rays reflected from the recording surface, and the phase compensation quantity necessary to reproduce the signal from the land or the groove is applied to the bundle of rays reflected from the recording surface. Accordingly, it is possible to simultaneously select the phase error and the electrical vector of the bundle of rays irradiated on the track by rotating the crystal optical axis OA1 of the ½ wave plate 12, and the tracks formed in the land and the groove can be reproduced under optimum conditions.

The bundle of rays passed through the ½ wave plate 12 is reflected by the polarization beam splitter 3 according to the reflecting characteristic of the polarization beam splitter 3, and is directed towards the magneto-optic signal detection system. In other words, the bundle of rays reflected by the polarization beam splitter 3 is supplied to the Wollaston prism 7 which separates the bundle of rays into 3 light components, namely, the P-polarized light component, the S-polarized light component, and the mixed light component in which the P-polarized light component and the S-polarized light component coexist. The 3 light components obtained from the Wollaston prism 7 are irradiated on the photodetector 10 via the convergent lens 8 and the cylindrical lens 9, and a photoelectric conversion takes place in the photodetector 10. As a result, it is possible to reproduce a magneto-optic signal having a high quality, similarly as in the case of the first embodiment described above.

Next, a description will be given of signal characteristics obtained when the information is recorded on and reproduced from the magneto-optic recording medium 6 according to this embodiment. In this case, the wavelength $\lambda$ of the bundle of rays emitted from the semiconductor laser 1 is 680 nm, and the numerical aperture (NA) of the objective lens 5 is 0.55, similarly as in the case of the first embodiment described above. In addition, the magneto-optic recording medium 6 is a magneto-optic disk, widths of the land and the groove are 0.7 $\mu$m in a radial direction of the magneto-optic disk, and an optical depth of the groove is $\lambda/8$. Furthermore, the electrical vector of the bundle of rays (laser light) irradiated on the recording surface of the magneto-optic disk is parallel to the tracks formed on the land and the groove.

Figure 12:
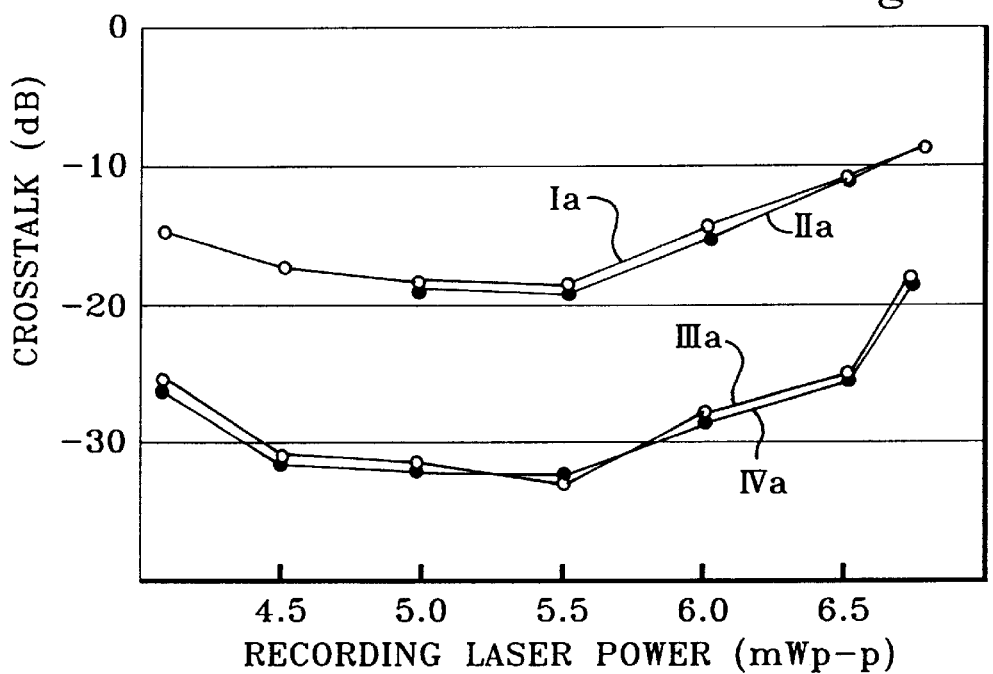
FIG. 12 is a diagram showing measured result of a recording laser power dependency of a crosstalk from an adjacent track.

First, a mark having a mark length of 2 $\mu$m was recorded on the land (or groove) of the magneto-optic disk, and a carrier level Cm was measured. In addition, the groove (or land) which is adjacent to the above described land (or groove) was reproduced, and a crosstalk Ct=Cm−Camax was obtained by denoting the higher carrier level by Camax. FIG. 12 shows measured results of a recording laser power dependency of the crosstalk from the adjacent track obtained in this manner. In FIG. 12, a white circular mark indicates the crosstalk from the land, and a black circular mark indicates the crosstalk from the groove. In addition, characteristics Ia and IIa indicate characteristic which are obtained when no phase compensation is made, and characteristics IIIa and IVa indicate characteristics which are obtained when the phase compensation is made as in this embodiment.

As shown in FIG. 12, both the crosstalks from the land and the groove are −30 dB or less in a wide recording laser power range. In addition, since the optical depth of the groove of the magneto-optic disk is $\lambda/8$, the phase compensation quantity which makes the crosstalk a minimum and the phase compensation quantity which makes a CNR a maximum match when the signals are recorded on and reproduced from the land and the groove. In other words, the phase compensation quantity which makes the CNR a maximum and the crosstalk a minimum is the same for the case where the signal is reproduced from the land and for the case where the signal is reproduced from the groove.

Figure 13:
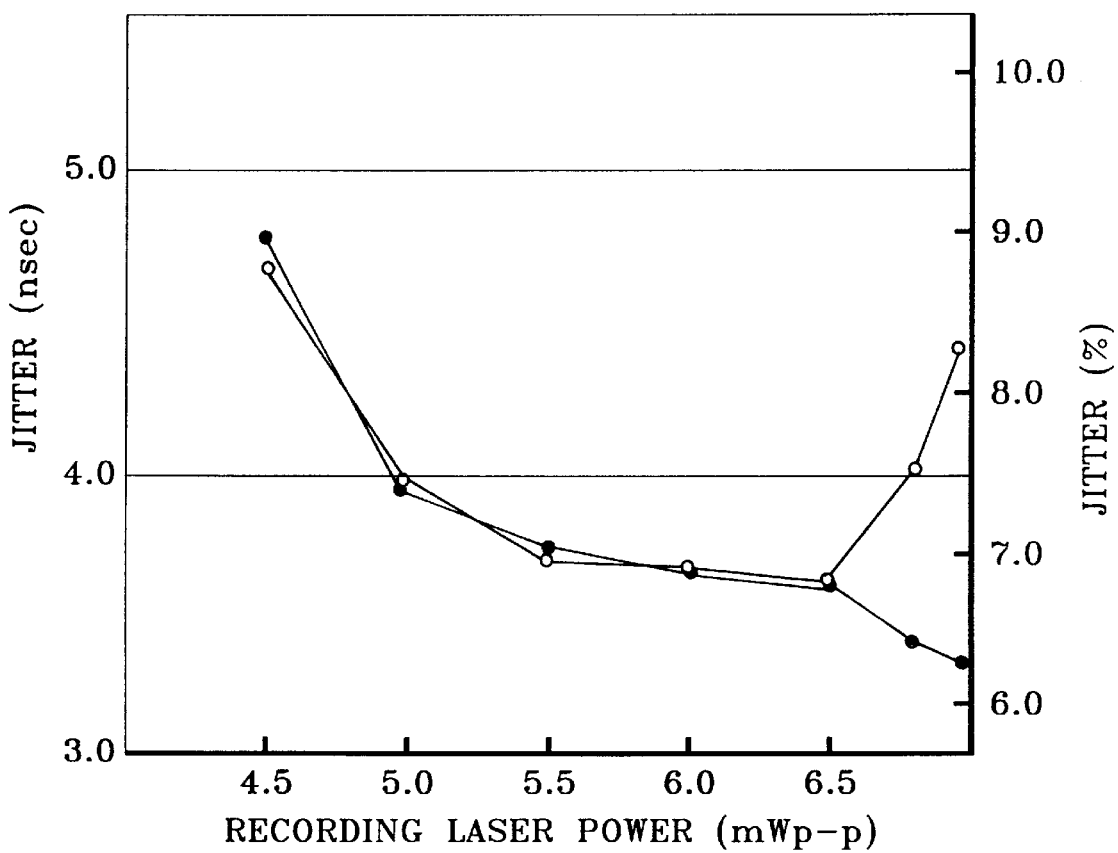
FIG. 13 is a diagram showing measured results of a recording laser power dependency of a 2T jitter.

Next, a random signal having a length 2T=0.48 $\mu$m which is a minimum mark length in the RLL1–7 (RLL: run length limited) code was recorded on the magneto-optic disk at a linear velocity of 4.5 m/sec according to the pulse assist magnetic field modulation system, and then reproduced at a reproducing laser power of 1.3 mW. FIG. 13 shows measured results of the recording laser power dependency of the 2T-jitter obtained in this manner. In FIG. 13, a white circular mark indicates the jitter from the land, and a black circular mark indicates the jitter from the groove. The jitter in this case is defined as a value (%) which is obtained by multiplying 100 to a ratio of a standard deviation σ2T of the 2T signal with respect to a predetermined window width (time). In addition, the reproducing laser power refers to the laser power when the light is output from the objective lens 5.

As shown in FIG. 13, when the signal was recorded on both the land and the groove of the magneto-optic disk and then reproduced, it was confirmed that the jitter is 9% or less in a wide recording laser power range and that a large margin can be secured with respect to the jitter. Generally, if an average jitter between a clock and the data is 12% or less, it is judged that the jitter is within a sufficiently tolerable range for the data recording and reproduction. In this embodiment, even though the evaluation is made with respect to the jitter of 2T which is the minimum mark length, a satisfactory result in which the jitter is 9% or less was obtained, and it was therefore confirmed that the data recording and reproduction is completely unaffected by the jitter from the practical point of view.

When no phase compensation is made, the crosstalk between the tracks is −20 dB or greater and is extremely large as may be seen from the characteristics Ia and IIa shown in FIG. 12. For this reason, when reproducing the signal from the land and the groove in this case, it was impossible to realize a jitter of 12% or less at any recording laser power.

On the other hand, this embodiment carries out the phase compensation for reproducing the signal from the land of the magneto-optic disk and the phase compensation for reproducing the signal from the groove of the magneto-optic disk by use of a relatively simple structure. As a result, no inconveniences such as the reduction of the signal level and an insufficient CNR are introduced because the phase compensations are made, and it is possible to greatly improve the signal quality when recording and reproducing the signal on and from the magneto-optic disk. Furthermore, the electrical vector of the bundle of rays irradiated on the recording surface is set perpendicular with respect to the track when reproducing the track formed in the land, and parallel to the track when reproducing the track formed in the groove. For this reason, the difference between the characteristics when reproducing the tracks formed in the land and the groove is further reduced compared to that of the first embodiment, and optimum reproducing conditions can be obtained with respect to each of the tracks formed in the land and the groove.

Figure 14:
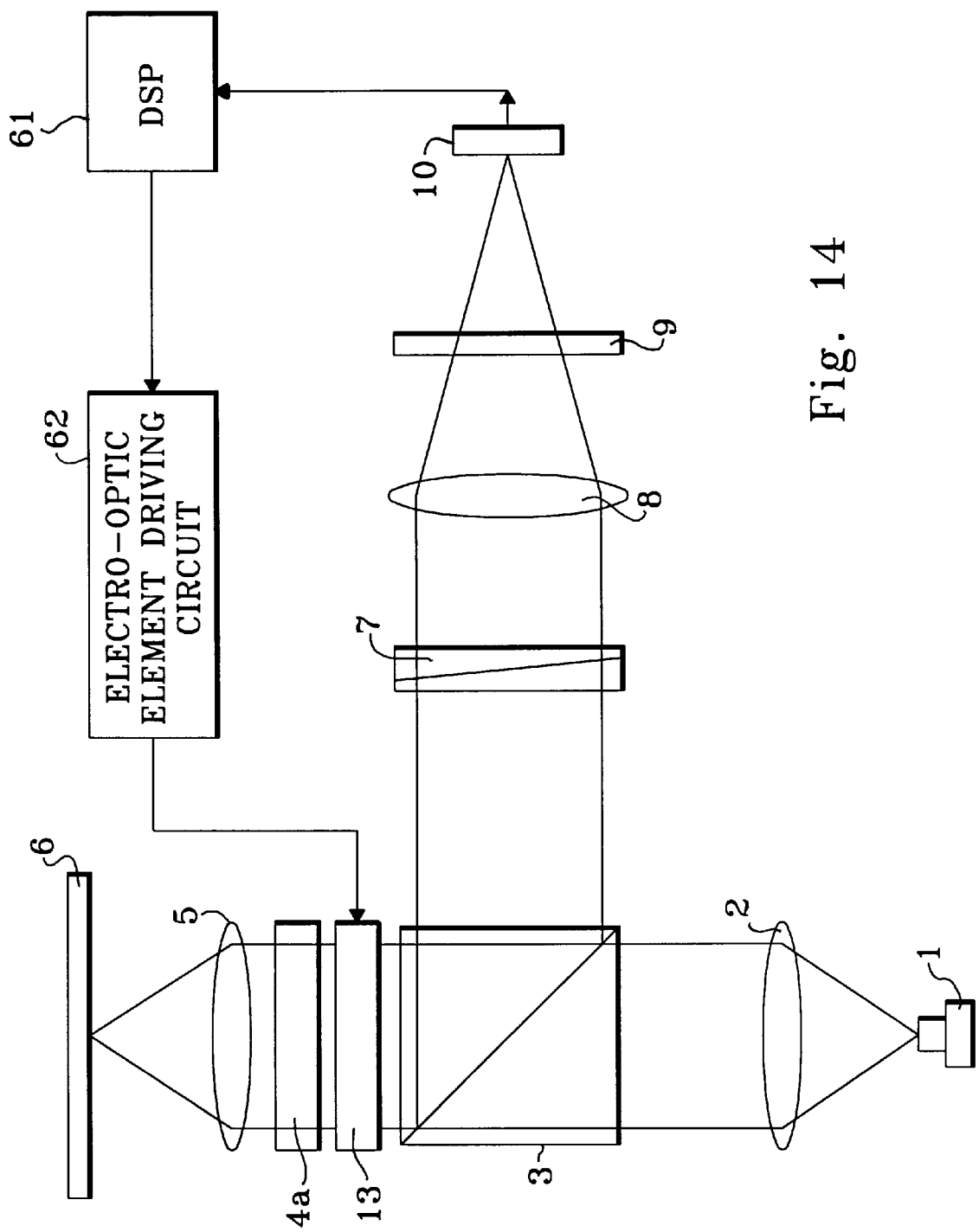
FIG. 14 is a plan view showing the general construction of an optical system of a third embodiment of the optical information storage unit according to the present invention.

Next, a description will be given of a third embodiment of the optical information storage unit according to the present invention. FIG. 14 is a plan view showing the general construction of an optical system of the third embodiment. In FIG. 14, those parts which are the same as those corresponding parts in FIG. 7 are designated by the same reference numerals, and a description thereof will be omitted.

As shown in FIG. 14, this embodiment is provided with an electro-optic element 13 in place of the ½ wave plate 12 shown in FIG. 7. For example, a KDP element or the like may be used as the electro-optic element 13. In addition, a digital signal processor (DSP) 61 and an electro-optic element driving circuit 62 are provided to control the electro-optic element 13. The DSP 61 discriminates whether the track being reproduced is formed in the land or the groove based on the address on the magneto-optic disk, the polarity of the tracking error signal (push-pull signal) and the like, similarly as in the case of the CPU 51 shown in FIG. 7, and supplies a control signal indicating the land or the groove to the driving circuit 62. The address on the magneto-optic disk, the polarity of the tracking error signal and the like may be detected by a known means based on the output detection signals of the photodetector 10. The driving circuit 62 applies a voltage of 0 V or a half-wave voltage to the electro-optic element 13 in response to the control signal from the DSP 61.

Therefore, the electrical vector of the bundle of rays passed through the electro-optic element 13 is controlled so as to become parallel or perpendicular to the track that is being reproduced, depending on the voltage received from the driving circuit 62. In other words, it is possible to suitably control the electrical vector of the bundle of rays passed through the electro-optic element 13 depending on whether the track being reproduced is formed in the land or the groove. The phase error generated by the electro-optic element 13 corresponds to a phase error between a component in a +45° direction with respect to the electrical vector of the bundle of rays incident to the electro-optic element 13 and a component in a −45° direction with respect to the electrical vector of the bundle of rays incident to the electro-optic element 13.

The bundle of rays passed through the electro-optic element 13 is supplied to the wave plate 4a. The polarity of the phase compensation quantity applied to the bundle of rays by the wave plate 4a changes depending on the state of the electro-optic element 13. For this reason, it is possible to obtain an optimum phase compensation quantity when reproducing the track formed in the land or the groove.

The measured results of the recording laser power dependency of the crosstalk from the adjacent track and the measured result of the recording laser power dependency of the 2T jitter which are obtained for this embodiment were respectively the same as those shown in FIGS. 12 and 13 for the second embodiment described above.

Further, the present invention is not limited to these embodiments, but various variations and modifications may be made without departing from the scope of the present invention.

What is claimed is:

1. An optical information storage unit for irradiating light on a recording medium having a recording surface provided with a land and a groove and for detecting a reproduced signal from a light reflected from the recording medium, said optical information storage unit comprising:

phase compensation means, provided in an optical path through which the light irradiated on the recording medium and a reflected light from the recording medium passes, for applying with respect to the reflected light a first phase compensation quantity required to detect a signal from the land and a second phase compensation quantity required to detect a signal from the groove, said phase compensation means comprising:

a first wave plate having a direction of a crystal optical axis thereof fixed with respect to an electrical vector of the light irradiated on the recording medium; and a second wave plate, made up of a ½ wave plate, rotatable with respect to a light incident thereto, so as to switch between the first and second phase compensation quantities.

2. The optical information storage unit as claimed in claim 1, wherein said first wave plate applies a phase error $\lambda/2 \cdot N - P$ or $\lambda/2N \cdot N + P$ with respect to the reflected light, where $\lambda$ denotes a wavelength of the light irradiated on the recording medium, P denotes an absolute value of one of the first and second phase compensation quantities, and N denotes an integer greater than 0.

3. The optical information storage unit as claimed in claim 1, wherein said crystal optical axis of said first wave plate is parallel or perpendicular to an electrical vector of the light irradiated on the recording medium.

4. The optical information storage unit as claimed in claim 1, wherein said second wave plate has a state where a crystal optical axis of the second wave plate is parallel or perpendicular to an electrical vector of the light incident thereto, and a state where the crystal optical axis of the second wave plate forms a 45° angle with respect to the electrical vector of the light incident thereto.

5. The optical information storage unit as claimed in claim 4, wherein said second wave plate has a state where a crystal optical axis of the second wave plate is perpendicular to the crystal optical axis of the first wave plate, and a state where the crystal optical axis of the second wave plate forms a 45° angle with respect to the crystal optical axis of the first wave plate.

6. The optical information storage unit as claimed in claim 1, wherein said second wave plate has a state where a crystal optical axis of the second wave plate is perpendicular to the crystal optical axis of the first wave plate, and a state where the crystal optical axis of the second wave plate forms a 45° angle with respect to the crystal optical axis of the first wave plate.

7. The optical information storage unit as claimed in claim 1, wherein said second wave plate has a state where a crystal optical axis of the second wave plate is parallel to the crystal optical axis of the first wave plate, and a state where the crystal optical axis of the second wave plate forms a 45° angle with respect to the crystal optical axis of the first wave plate.

8. The optical information storage unit as claimed in claim 4, wherein said second wave plate has a state where a crystal optical axis of the second wave plate is parallel to the crystal optical axis of the first wave plate, and a state where the crystal optical axis of the second wave plate forms a 45° angle with respect to the crystal optical axis of the first wave plate.

9. The optical information storage unit as claimed in claim 1, wherein said first wave plate is arranged in front of said second wave plate along a traveling direction of the reflected light from the recording medium.

10. The optical information storage unit as claimed in claim 1, wherein said phase compensation means comprises an electro-optic element in place of said second wave plate.

* * * * *

UNITED STATES PATENT AND TRADEMARK OFFICE
CERTIFICATE OF CORRECTION

PATENT NO.    : 6,118,748
DATED         : September 12, 2000
INVENTOR(S)   : Morimoto Page 1 of 1

It is certified that error appears in the above-identified patent and that said Letters Patent is hereby corrected as shown below:

Column 12, claim 1,
Line 3, after the phrase, "applies a phase error" please delete
$\lambda/2 \cdot N-P$ or $\lambda/2N \cdot N+P$" and insert -- $\lambda/2 \cdot N-P$ or $\lambda/2 \cdot N+P$ -- therefor.

Signed and Sealed this

Twenty-third Day of October, 2001

Attest:

NICHOLAS P. GODICI
Acting Director of the United States Patent and Trademark Office Attesting Officer